Feb. 19, 1963   S. B. HANSSEN   3,077,941
WEIGHING SCALE
Filed Jan. 29, 1960   2 Sheets-Sheet 1

Inventor:
Stan B. Hanssen
By: Hofgren, Brady, Wegner,
Allen & Stellman
Attorneys Feb. 19, 1963 S. B. HANSSEN 3,077,941
WEIGHING SCALE
Filed Jan. 29, 1960 2 Sheets-Sheet 2

Inventor:
Stan B. Hanssen
By: Hofgren, Brady, Wegner,
Allen & Wellman
Attorneys

United States Patent Office 3,077,941
Patented Feb. 19, 1963

3,077,941
WEIGHING SCALE
Stan B. Hanssen, Kenilworth, Ill., assignor to Hanson
Scale Company, a corporation of Illinois
Filed Jan. 29, 1960, Ser. No. 5,517
6 Claims. (Cl. 177—230)

This invention relates to a platform scale of the bathroom type and more particularly to a novel simplified structure in such a scale for counterbalancing a set of weight-receiving levers.

Bathroom scales of the type generally used today have cooperating levers which receive the weight of a person standing upon the scale. The levers are permitted to deflect a given amount against a yielding counterbalancing means and an indicating mechanism moves proportionally to the deflection for visual indication of the magnitude of the weight.

In the past, manufacturers of such scales have used a coiled tension spring to counterbalance the levers. The coiled springs were calibrated and accurately adjusted to the particular lever system to give a measured change in length in response to a given weight. In using such springs, the effective length of the spring was maintained during loading so that an accurate weight indication was given. In order to support the counterbalancing springs, the scales have generally been provided with a yoke mounting for suspending the tension coil spring above the levers. In addition to the yoke supporting the spring, structure has generally been used to adjustably support the spring in the yoke mounting so that the position of the levers and thus the indicating mechanism, could be varied to insure that the scale read zero when no weight reposed upon the scale platform. The use of the yoke support, tension spring and adjustable mounting features of such bathroom scale have limited cost reduction in manufacture of bathroom platform type scales.

Applicant has provided a novel and sturdy scale structure which permits considerable cost reduction without sacrificing the desirable characteristics of accurate weight indication.

It is the principal object of this invention to provide a new and improved bathroom scale of the platform type.

Another object of this invention is to provide an improved bathroom scale having a simplified structure for supporting a resilient member used to counterbalance a set of weight-receiving levers.

Another object is to provide an improved bathroom scale having means to support a coil type compression spring used to counterbalance a set of weight-receiving levers, said means permitting an initial calibration adjustment and thereafter requiring no further adjustment for accurate weight indication.

A further object of this invention is to provide a bathroom scale having structure to support a resilient member used to counterbalance a set of weight-receiving levers, the structure being adapted to prevent inaccurate functioning of the resilient member during loading of the scale.

A further object is to provide a bathroom scale permitting a top surface on the platform which is substantially flat in contour while retaining an over-all minimum scale height.

A still further object is to provide a bathroom scale having a coil compression spring disposed between a set of weight receiving levers and a scale base, the spring being secured at one end to a calibration bracket integrally formed with one of the levers and its other end seated on a block bearing against the base, the bracket and block cooperating to maintain the effective spring length of said spring during loading of the scale.

Other features, objects and advantages of the present invention will be obvious from the following description of the preferred embodiment illustrated in the accompanying drawings, in which.

Figure 1:
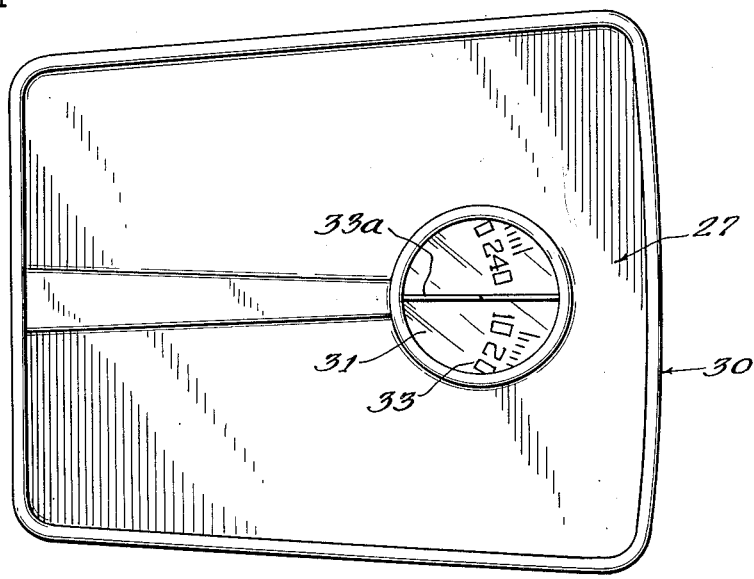
FIGURE 1 is a top plan view of a bathroom type scale having the inventions therein.
Figure 2:
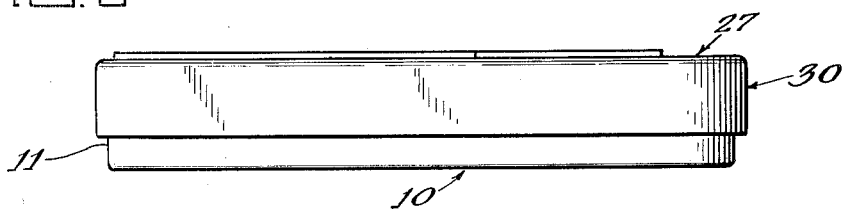
FIGURE 2 is a side elevational view of the bathroom scale shown in FIGURE 1.
Figure 3:
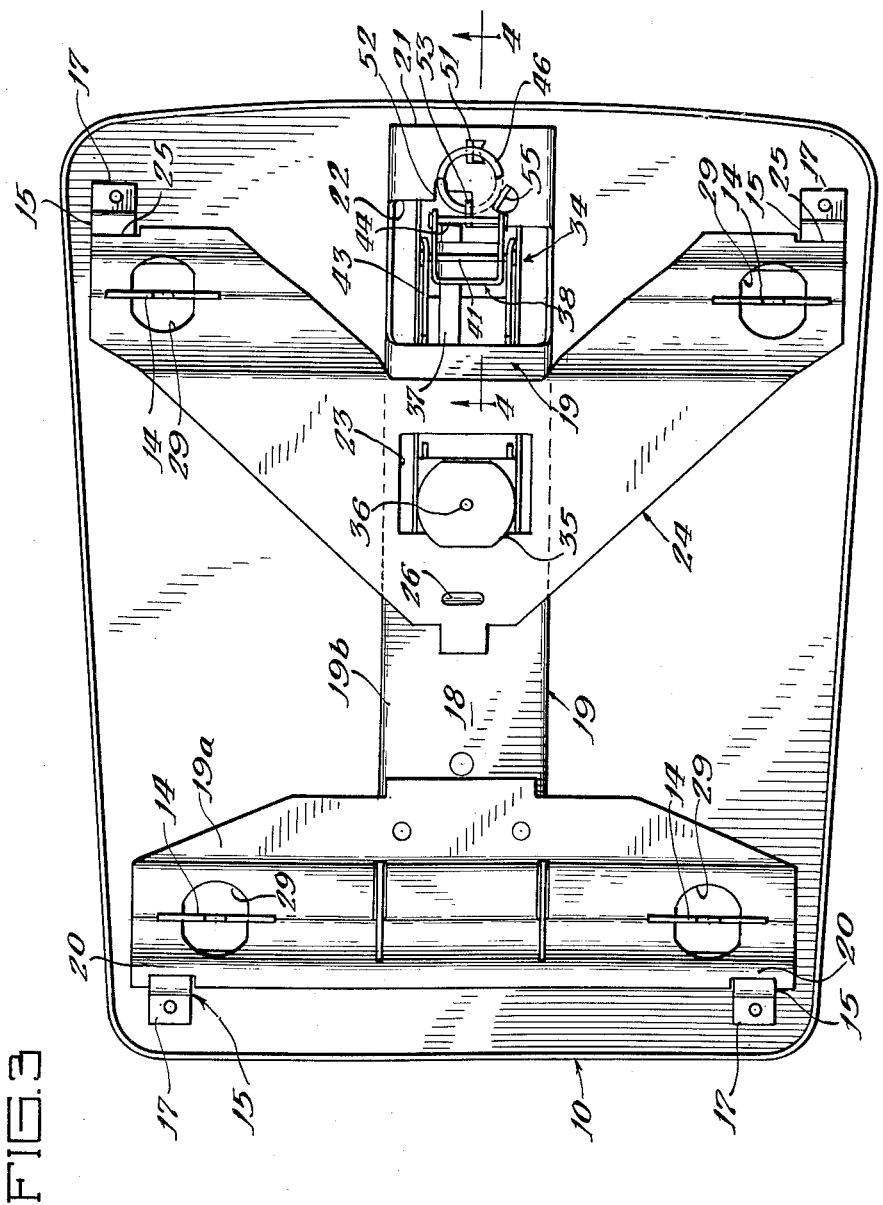
FIGURE 3 is an enlarged plan view of the scale with the upper platform and indicating dial removed.

Referring now to the drawings and more particularly to FIGURES 1–3, there is shown a preferred embodiment of the present invention as employed in a bathroom scale of the platform type. The general outer structure of the preferred embodiment is similar to that used in scale of this type for some time. Generally speaking, the scale is provided with a base supporting a pair of cooperating weight-receiving levers. A decorative cover telescopically fits over the base and is supported by the levers. A weight indicating mechanism is provided which is responsive to deflection of the levers and carries a dial which may be viewed through an opening in the cover to indicate the amount of weight placed on the cover. The present invention is concerned with economical and simplified structure for supporting a resilient member used to counterbalance the weight-receiving levers.

In particular, the parts referred to above comprise a base, generally indicated at 10, formed as a stamped sheet metal member having an upstanding peripheral edge 11 extending entirely around the base. The shape of the base may be chosen to make a particular aesthetic appearance of the scale but is in the present instance, as illustrated in FIGURE 1, generally rectangular. The sheet metal base is adapted to rest directly upon the floor and support the mechanism of the scale therein. The support takes the form of upstanding posts or projections 15 generally located in the four corner portions of the base. Each post 15 has a V-shaped section for knife-edge cradling of the end of a lever. The posts may be attached to the base by ears 17 secured directly to the metal of the base with suitable fasteners such as rivets or spot welding (FIGURE 3).

The weight sensing mechanism of the present scale consists of a pair of levers arranged in overlapping fashion and resting upon the upstanding posts at the corners of the base. While the levers may vary from those used in the past as to their specific shape, their function is the same as has been present in scales for many years. A T-shaped lever 19 is formed of two sections, 19a and 19b, secured together to form a one-piece member for all purposes. Section 19a forming the cross piece of the T has rear edge corner portions 20 constructed to provide knife edges to pivotally rest in the V-section of a pair of upstanding posts at one end of the base and longitudinally extending section 19b is channel-shaped having downwardly turned sides of slightly diminishing depth toward the counterbalanced supported end 21 of the lever. A generally V-shaped lever 24 is positioned above the T-shaped lever 19 and has end portions 25 constructed to provide knife edges to pivotally rest in the V-section of another set of upstanding posts on the base. The apex of the V-shaped lever 24 has a downwardly extending boss 26, which pivotally engages and rests upon an intermediate portion of the channel-shaped section 19b of the T-shaped lever. The web 18 of the channel-shaped section 19b has cutout portion 22 and another cutout portion (not shown) aligned with cutout portion 23 in the V-shaped lever. The cutout portions are provided to accommodate the projection of parts of the scale structure through the levers.

A platform 27 for the scale is provided with four depending legs (not shown) each having a V-shaped end adapted to rest on knife-edged metal hangers 14 supported on the edge 29 of an opening provided in the levers for such purpose. The platform has a depending skirt 30 (FIGURE 2) at its periphery which extends over the base hiding most of it from view. The platform provides a weight receiving upper surface upon which a person may stand. The weight is transferred by the hangers 14 to the levers causing the levers to pivot toward the base. A lens 31 is carried in the flat surface portion of the platform through which a weight indicating dial 33 may be viewed. The weight sensed may be read as that amount shown on the dial under an indicia marker 33a carried on the platform.

Figure 4:
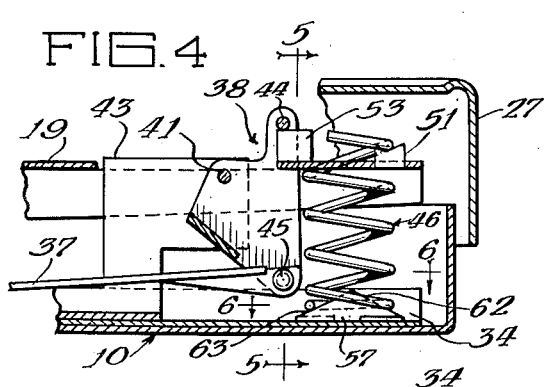
FIGURE 4 is a still further enlarged fragmentary sectional view of the scale taken substantially as indicated along line 4—4 of FIGURE 3 illustrating the lever counterbalancing means.
Figure 5:
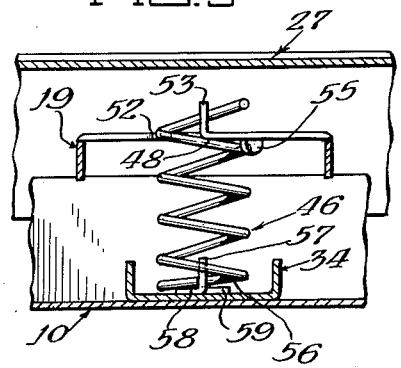
FIGURE 5 is a fragmentary sectional view of the scale taken substantially as indicated along line 5—5 of FIGURE 4.
Figure 6:
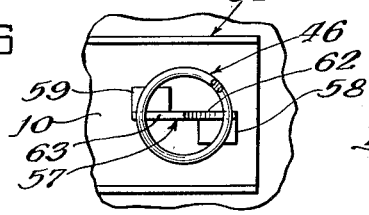
FIGURE 6 is a fragmentary sectional view of the counterbalancing means and base taken substantially as indicated along line 6—6 of FIGURE 4.

The weight indicating mechanism is mounted on a channel support 34 secured to the base at a position generally centrally located in the base between the upstanding posts. The mechanism includes a dial 33 having weight indicating markings thereon with the markings for the unweighted condition of the scale omitted. The dial is supported upon a disc 35 turned by a pinion gear 36 mounted on the channel support 34 and extending vertically through the cutout portion 23 of the primary lever. The pinion gear is turned by a substantially horizontally extending rack 37 which is pivotally secured to a bell crank 38. The bell crank 38 comprises a generally U-shaped bracket supported on a rod 41 extending transversely through the bell crank sides and pivotally journalled on the upstanding sides 43 of the channel support for the indicating mechanism. A bar 44 is secured to the outermost end of the bell crank and is arranged to engage the primary lever 19 so as to move downwardly with and in response to a lever deflection. The rack 37 is pivotally connected at 45 to the lower end of the bell crank to move with movement of the levers and bell crank. As shown in FIGURE 4, the bell crank movement will be in a clockwise direction when the levers are deflected downwardly by weight on the scale. The bell crank is held in engagement with the primary lever by a spring (not shown) connected to one end of the rack.

The present invention is concerned primarily with novel structure in the scale for supporting a resilient member used to accurately counterbalance the weight-receiving levers. The counterbalancing means comprises a coiled compression spring 46 disposed vertically between the base and the counterbalanced end 21 of the primary levers. The free end of lever 19 is formed to receive the counterbalancing spring in such a manner that the effective free length of the spring may be easily determined during manufacture of the scale.

The end portion 21 of the lever 19 adjacent the opening 22 is formed so that the coils of the spring 46 may be threaded into the lever. A coil of the spring is held in engagement with an edge 48 on the lever by passing the adjacent portion of the spring over an upstanding boss 51 extending upwardly from the upper surface of the lever. The boss 51 has a V-shaped upper edge to cradle the coil of the spring. Portions of the lever adjacent the opening 22 are cut away as at 52 to avoid contact between the coil and the lever between the edge 48 and the upstanding boss 51 to insure that the spring is maintained in contact with the lever on the lower edge 48. An ear member 55 is struck downwardly from the surface of web 18 adjacent to the shoulder 48 so as to abut the periphery of the spring coils and help in maintaining the alignment of the spring in its threaded position in the lever during loading of the scale. Adjustment of the coil spring can be effected by screwing the spring about the bracket with sufficient force to overcome the friction of the coils against the lever. An upstanding ear 53 above the edge 48 is integral with the lever 19 and forms a bearing under the crossbar 44 on the upper end of the bell crank insuring that deflection of the levers allows movement of the bell crank and indicating mechanism therewith.

The bottom coil 56 of the coil spring is seated upon a triangularly shaped block 57 having extensions 58 and 59 resting within the channel support on the base. The block has diverging upper surfaces 62 and 63 extending upwardly into the inner space of the coil spring engaging the coil at opposite points.

It is important to the continued accuracy of a bathroom scale that the spring's effective length be maintained constant throughout its use. The present invention insures such accuracy and provides a simplified spring support which obviates the need for subsequent adjustments. A manufacturer of the scale need only properly calibrate the coil spring for use with a particular lever system and adjust the effective spring length at the factory. The spring and support need not be adjusted thereafter since the support is durable and compact and will not be appreciably affected by shipment or use. The block support 57 for the bottom coils will prevent collapse of the coils of the spring upon themselves during compression to affect the effective spring length. The calibration bracket on the lever will rigidly hold the spring in position while permitting a very accurate initial adjustment of the effective spring length. The entire spring mounting structure is compact in order to permit the scale to have a minimum over-all height. The combination of the triangular-shaped block 57 and the adjustable positioning of the spring 46 to the lever 19 permits the effective length of the spring from the edge 48 to the first contact with the block 57 to be adjusted at the factory. Ordinarily, it is preferred to eliminate a zero indication on the dial as it has been found that the factory setting of the calibrating spring in the lever 19 will give accurate weight indication even though the zero indication on the dial might not precisely register with the indicia line 33a on the scale platform. Sufficient friction in the spring to lever assembly is present to insure retaining the factory adjusted position of the assembly. The triangular bracket or block 57 maintains the effective length of the spring as coils are not permitted to collapse upon themselves to vary the effective length. The use of the compression spring as herein specified and the elimination of parts usually used with a tension counterbalancing spring permit construction of a scale at substantially less manufacturing cost.

The foregoing detailed description has been given for clearness of understanding only and no unnecessary limitation should be understood therefrom for some modification will be obvious to those skilled in the art.

I claim:

1. A platform type scale, a base, cooperating levers mounted upon the base in superposed relation, a weight-receiving platform resting upon the levers and calibrated coil spring means supporting one end of one of the levers for deflection of the levers proportional to weight placed on the platform, said one lever having a web with upper and lower surfaces and an opening through the web with an integral edge forming one side of the opening, said opening threadably receiving and supporting a coil of said spring in contact with said edge, upstanding means on the one lever adjacent the opening and extending above said web, said means cradling said coil of said spring above said web maintaining said coil against the integral edge, said spring being adjustably threadedly moveable to change the point of contact between the integral edge and the spring for selective adjustment of the effective length of the coil spring extending from the lever; and weight-indicating mechanism responsive to deflection of said cooperating levers.

2. A platform type scale, comprising: a base, cooperating levers arranged in superposed relationship upon the base, and a weight-receiving platform resting upon the levers, one of said levers having an opening therethrough at one end with an integral edge forming a side of the opening and a spaced, upstanding coil engaging portion shaped to receive a spring threaded through the opening with the coil resting against said edge and extending over the upstanding portion; a coiled compression spring extending generally upright from the base and having its bottom end seated on said base and its upper end threaded into said end portion of said opening in said one lever, against said edge and over said upstanding portion in an upright distended position, said one lever end portion edge engaging said spring coil at a point with the portion of the spring between said edge and base providing the effective length of the spring, said spring yieldingly supporting the levers providing a calibrated deflection of the levers in response to weight placed on said platform.

3. A platform scale of the bathroom type, comprising: a base; cooperating primary and secondary levers arranged in superposed relationship, each having one end pivotally supported on said base and said secondary lever having a free end supported on an intermediate portion of said primary lever, said primary lever having a free end adapted to be counterbalanced, a weight-receiving platform resting upon said levers; a coiled compression spring disposed upright between said base and said free end of the primary lever, said primary lever having a web with upper and lower surfaces; mounting means including a sharp edge in the plane of the lower surface of said web engaging a coil of the spring and an integral ear extending outwardly and upwardly from the lever and engaging said coil of said spring to hold the spring in a distended position and maintain a predetermined engagement between said edge on said lever and a point on said spring, said mounting means adjustably supporting said spring for adjustment of the effective length of said spring extending between said primary lever edge and said base; an upwardly extending block at the base end of said spring having opposite upstanding knife edge surfaces engaging and supporting the spring at opposite points on the coils thereof to insure that the effective length of said spring is not changed during compression, said spring yieldingly supporting the levers providing a calibrated deflection of the primary lever in response to weight placed on said platform.

4. In a bathroom scale having a base supporting a pair of cooperating weight-receiving levers, counter-balancing means, comprising: a channel element secured to said base having an upwardly extending block with opposite upstanding knife edge sloping sides; a coil compression spring extending upright in said scale and having its bottom coil seated on knife edge sloping sides of said block, one of said levers having a web with an opening therein to receive a coil of said spring and an integral edge forming one side of the opening for engaging the coil of said spring at a selected finite point along the length of said coil, said one lever having an integral member extending outwardly from said web in position for said coil to pass thereover distending said spring and maintaining said finite point engagement so as to provide a constant length of compression spring between said edge and said block knife edges to counterbalance said levers during use of the scale.

5. A platform scale of the bathroom type, comprising: a shallow open-top pan forming a base having upwardly extending and spaced apart projections; cooperating primary and secondary levers arranged in superposed relationship, each lever having one end pivotally bearing on a separate set of projections of said base and the primary lever having a free end counterbalanced; a platform having a substantially flat weight-receiving surface and having sides telescoping over said base, said platform being mounted on the levers so that the weight placed thereon may move the levers toward the base; a coil compression spring disposed upright between said base and the counterbalanced end of said primary lever to yieldingly support said levers and providing a calibrated deflection of the levers in response to weight placed on the platform, said counterbalanced end of the primary lever having an integral calibrating bracket portion securing said spring to said primary lever so that an accurate effective spring length extends between the base and the primary lever, said calibrating bracket portion including an integral post extending upwardly from the lever for cradling a coil of the spring and an integral edge portion on the lever adjacent thereto for engaging a coil of the spring adjacent the post, said edge portion bearing downwardly on a coil and said post holding the adjacent coil portions in a vertically distended position thereby clamping said spring to said primary lever, a generally upstanding block providing sharp edges supporting the lower coils of said spring on said base, said block having slanting sides extending upwardly and into the inner space of said coil spring and the bottom coil of said spring bearing downwardly on said slanting sides, said spring having a constant effective length between said edge portion on the lever and said sharp edge on said block during deflection of the weight sensing levers; and a weight-indicating mechanism responsive to deflection of said counterbalanced end of said primary lever.

6. A platform type scale, comprising: a base having spaced apart projections extending upwardly therefrom, a pair of cooperating levers bearing on said upward projections of the base for carrying a weight-receiving platform; counterbalancing means including a coil spring, an integral edge on one of said levers and means on said one lever upstanding from the surface of the lever for cradling a coil of said spring to hold the adjacent portion of the spring against said edge, said coil spring yieldingly supporting at least one of the levers above said base providing a calibrated deflection of the levers in response to weight placed on said platform; and a weight indicating mechanism responsive to deflection of said levers.

References Cited in the file of this patent

UNITED STATES PATENTS

| | | |
|---|---|---|
| 202,019 | Gray | Apr. 2, 1878 |
| 1,895,863 | Pollak | Jan. 31, 1933 |
| 2,066,243 | Barler et al. | Dec. 29, 1936 |
| 2,145,419 | Hopkins | Jan. 31, 1939 |
| 2,668,045 | Provenzano | Feb. 2, 1954 |

FOREIGN PATENTS

| | | |
|---|---|---|
| 931,441 | Germany | Aug. 8, 1955 |